(12) United States Patent
Muthukrishnan et al.

(10) Patent No.: US 11,368,304 B2
(45) Date of Patent: Jun. 21, 2022

(54) SYSTEMS AND METHODS FOR GENERATING A PARTS LOGBOOK USING BLOCKCHAIN TECHNOLOGY

(71) Applicant: Honeywell International Inc., Morris Plains, NJ (US)

(72) Inventors: Sathish Muthukrishnan, Phoenix, AZ (US); Sujaya Rao, Bangalore (IN); Satyanarayan Kar, Bangalore KA (IN); Vinayakumar Kasimsetty, Phoenix, AZ (US); Keerthi Jayarajan, Bangalore KA, IN (US); Kamesh Palani, Bangalore KA (IN); Timothy Hearn, Scottsdale, AZ (US)

(73) Assignee: Honeywell International Inc., Charlotte, NC (US)

( * ) Notice: Subject to any disclaimer, the term of this patent is extended or adjusted under 35 U.S.C. 154(b) by 126 days.

(21) Appl. No.: 16/903,533

(22) Filed: Jun. 17, 2020

(65) Prior Publication Data
US 2021/0399889 A1 Dec. 23, 2021

(51) Int. Cl.
*H04L 9/32* (2006.01)
*G06F 16/18* (2019.01)

(52) U.S. Cl.
CPC ............ *H04L 9/32* (2013.01); *G06F 16/1805* (2019.01)

(58) Field of Classification Search
CPC ....... H04L 9/32; H04L 63/00; H04L 2209/38; H04L 9/3239; G06F 16/1805
See application file for complete search history.

(56) References Cited

U.S. PATENT DOCUMENTS

| | | | |
|---|---|---|---|
| 10,002,112 B2 | 6/2018 | Hamblin et al. | |
| 2018/0225651 A1 | 8/2018 | Stone et al. | |
| 2019/0365063 A1* | 12/2019 | Nyfeler | A44C 15/004 |
| 2020/0126321 A1* | 4/2020 | Swearingen | G06Q 10/063 |
| 2020/0293959 A1* | 9/2020 | O'Herlihy | G06Q 10/0633 |
| 2021/0217317 A1* | 7/2021 | Ali | G06F 9/547 |
| 2021/0273819 A1* | 9/2021 | Rueckriemen | H04L 9/3268 |

FOREIGN PATENT DOCUMENTS

DE 10 2017 204 538 A1 9/2018

* cited by examiner

*Primary Examiner* — Abiy Getachew
(74) *Attorney, Agent, or Firm* — Bookoff McAndrews, PLLC

(57) ABSTRACT

Systems and methods are disclosed for generating a parts logbook using blockchain technology. The method may include: receiving, by a processor, part information of a part from a first user device; adding, by the processor, a first block including the received part information to a copy of a blockchain database of a blockchain network; verifying, by the processor, the received part information of the part via the blockchain network; when the received part information of the part is verified, generating, by the processor, a parts logbook for the part based on the verified part information of the part; and transferring, by the processor, the generated parts logbook for the part to a second user device for displaying the generated parts logbook on the second user device.

17 Claims, 5 Drawing Sheets

PART TRACE    P/N: B50A000-00-100    S/N: B1003242

400

| DATE ⇕ | CONDITION ⇕ | EVENT TYPE ⇕ | EVENT ⇕ | ORIGIN ⇕ | DESTINATION ⇕ |
|---|---|---|---|---|---|
| 06/19/2019 | REPAIRED | RECEIPT FROM SERVICE CENTER | UNIT RECEIVED INTO INVENTORY | SERVICE CENTER | HOST ORGANIZATION |
| 06/18/2019 | REPAIRED | SERVICE COMPLETE | UNIT SERVICED | SERVICE CENTER | SERVICE CENTER |
| 06/06/2019 | REPAIRABLE | SENT TO SERVICE CENTER | UNIT SENT FOR REPAIR / MAINTENANCE / INSPECTION | HOST ORGANIZATION | SERVICE CENTER |
| 01/31/2018 | REPAIRABLE | RECEIPT FROM EXTERNAL SOURCE | UNIT RECEIVED INTO INVENTORY | EXTERNAL | HOST ORGANIZATION |
| 03/03/2017 | NEW | RECEIPT FROM SERVICE CENTER | UNIT RECEIVED INTO INVENTORY | ORGANIZATION Y | HOST ORGANIZATION |
| 1/13/2017 | NEW | BILL OF SALE | UNIT SOLD | HOST ORGANIZATION | ORGANIZATION Y |
| 10/10/2016 | NEW | RETURN | UNIT RETURNED | ORGANIZATION X | HOST ORGANIZATION |

FIG. 4

SYSTEMS AND METHODS FOR GENERATING A PARTS LOGBOOK USING BLOCKCHAIN TECHNOLOGY

TECHNICAL FIELD

Various embodiments of the present disclosure generally relate to the use of shared ledger databases and other blockchain technology to record information and, more particularly, to systems and methods for generating a parts logbook using blockchain technology.

BACKGROUND

Vehicle parts, such as aircraft parts, may include a logbook for keeping a record for the part. For example, a logbook for vehicle or other equipment parts may be a record in which all data concerning the part and/or all the parts on the vehicle or equipment is recorded. For the aerospace industry, aircraft logbooks are used to determine aircraft condition, date of inspections, and the time a part has spent in service on an aircraft. Accordingly, a parts logbook reflects a history of all events occurring to the vehicle and its components and accessories. The logbook for an aircraft is used to determine and certify airworthiness for the aircraft. For example, logbooks are mandated by regulators for compliance purposes and the information form the logbook is extensively used in both technical (e.g., maintenance condition) and business (e.g., sale of part) aspects. Currently, logbooks for such parts are kept as large, physical documents, such as a notebook, three ring binder, or the like, and may be updated by hand. Paper logbooks may be difficult to preserve through the life of a part, lack real time visibility of the part condition, require significant time to update, include unstructured data in numerous formats, and it may be inefficient to search for documents in such paper logbooks. Further, it may be difficult to create a digital logbook due to such logbooks being prone to false information, incomplete information, lack of digital records, and/or tampered data.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for generating a parts logbook using blockchain technology.

In one embodiment, a computer-implemented method for generating a parts logbook using blockchain technology is disclosed. The method may include: receiving, by a processor, part information of a part from a first user device; adding, by the processor, a first block including the received part information to a copy of a blockchain database of a blockchain network; verifying, by the processor, the received part information of the part via the blockchain network; when the received part information of the part is verified, generating, by the processor, a parts logbook for the part based on the verified part information of the part; and transferring, by the processor, the generated parts logbook for the part to a second user device for displaying the generated parts logbook on the second user device.

In another embodiment, a system for generating a parts logbook using blockchain technology is disclosed. The system may include: a memory having processor-readable instructions therein and at least one processor configured to access the memory and execute the processor-readable instructions, which when executed by the processor configures the processor to perform a plurality of functions. The plurality of functions may include functions for: receiving part information of a part from a first user device; adding a first block including the received part information to a copy of a blockchain database of a blockchain network; verifying the received part information of the part via the blockchain network; when the received part information of the part is verified, generating the parts logbook for the part based on the verified part information of the part; and transferring the generated parts logbook for the part to a second user device for displaying the generated parts logbook on the second user device.

In yet another embodiment, a non-transitory computer-readable medium containing instructions for generating a parts logbook using blockchain technology is disclosed. The instructions may include: receiving, by a processor, part information of a part from a first user device; adding, by the processor, a first block including the received part information to a copy of a blockchain database of a blockchain network; verifying, by the processor, the received part information of the part via the blockchain network; when the received part information of the part is verified, generating, by the processor, the parts logbook for the part based on the verified part information of the part; and transferring, by the processor, the generated parts logbook for the part to a second user device for displaying the generated parts logbook on the second user device.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4 depicts an exemplary view of a digital parts logbook generated using the network environment and system of FIG. 1.

DETAILED DESCRIPTION OF EMBODIMENTS

Figure 1:
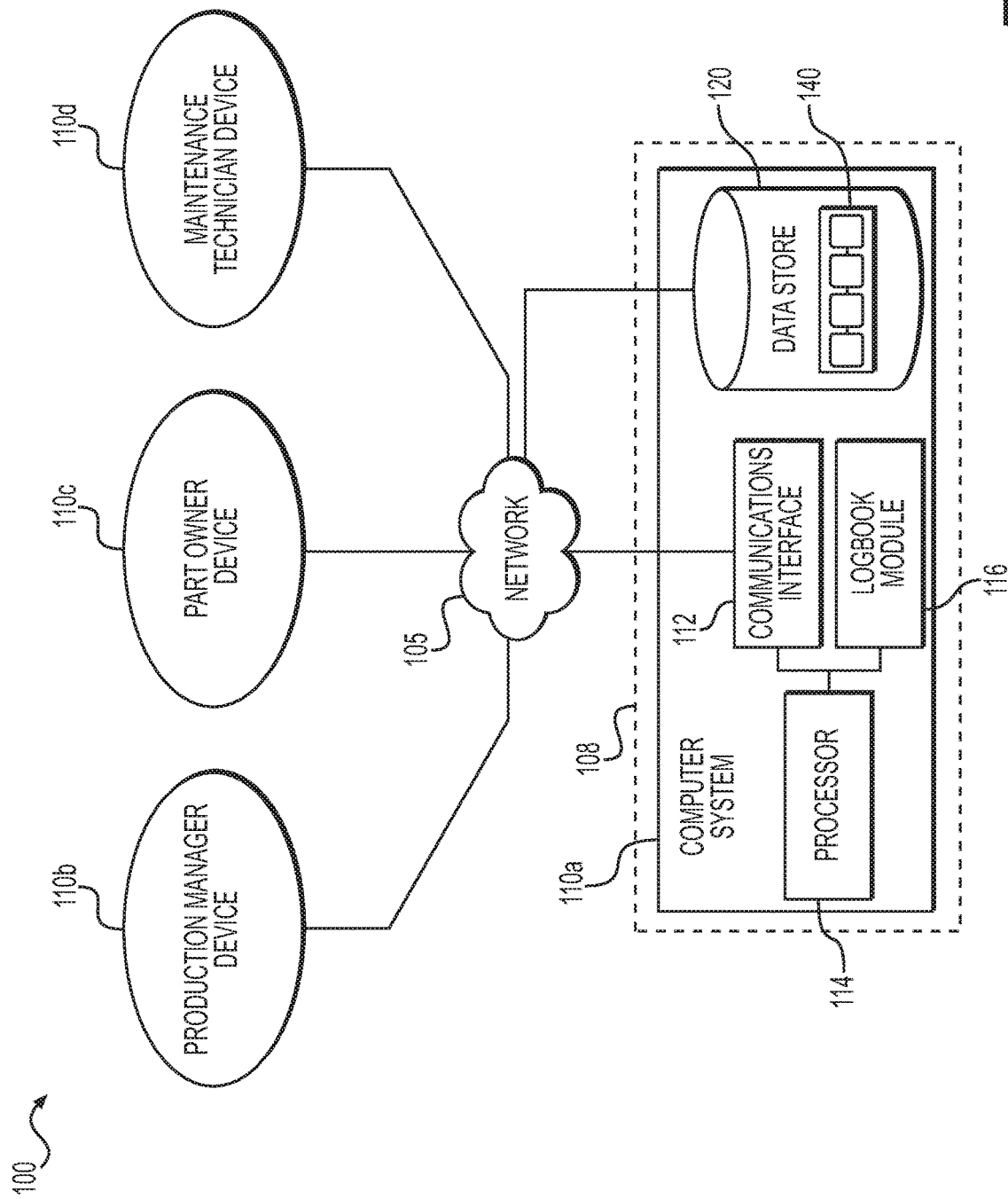
FIG. 1 depicts an exemplary network environment and system for generating a parts logbook using blockchain technology, according to one or more embodiments.

In general, systems and methods of the present disclosure utilize blockchain technology to record information, such as information pertaining to parts for generating a digital parts logbook.

As will be discussed in more detail below, a network comprising various computer systems may manage a blockchain used for the recording of information. The computer systems of the network may belong to parties, such as suppliers and owners of aviation parts, and may function as nodes of the network. A parts logbook for the part may be generated and part information of the part may be added to the blockchain. The blockchain may advantageously store the information in a manner that is resistant to subsequent alteration. Life cycle information, service records, and/or other information and documents associated with the part may also be added to the blockchain for the part when the part undergoes service and/or other life cycle events. For example, ownership transfers may be recorded in the logbook when the part, assembly, or sub-assembly on which the part is assembled is sold, leased, rented, etc. The digital logbook may be shared among the various participants of the blockchain network for adding information and documents to the logbook. The blockchain participants and the information and documents may be verified by the blockchain network. Thus, a secure and verified digital logbook that is resistant to alteration may be generated and updated for the part.

In an exemplary embodiment, a logbook for an aircraft engine may include birth records, service records, and ownership changes. The logbook for the engine may be created when the engine is manufactured (e.g., birth of the engine). The birth records may be added to the logbook through the blockchain. When nacelles are installed on the engine, a corresponding service record may be added to the logbook. The engine may then be installed on the aircraft and another service record may be added to the logbook. An owner/operator, such as an airline, may operate the aircraft with the engine installed and may add records to the logbook. When the engine requires service, a maintenance repair and operations technician may service/repair the engine and add a corresponding service record to the logbook. Further, the owner may lease the aircraft to an operator and the leasing contract and information may be added to the logbook. The operator may be added to the logbook such that the operator may view the logbook. During the life of the engine, a regulator, auditor, or the like may audit and review the logbook for compliance. When the engine is retired, the engine may be dismantled and the dismantler may review the logbook. Thus, a logbook for an engine may be created and updated.

In the following description, embodiments will be described with reference to the accompanying drawings. The terminology used in this disclosure may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a" and "an" include plural referents unless the context dictates otherwise. The term "exemplary" is used in the sense of "example" rather than "ideal." The terms "information," "data," and "content" may be interchangeable when permitted by context. The terms "record" and "store," in the sense of recording or storing data, may be interchangeable when permitted by context. The terms "comprises," "comprising," "includes," "including," and other variations thereof, are intended to cover a non-exclusive inclusion such that a process, method, or product that comprises a list of elements does not necessarily include only those elements, but may include other elements not expressly listed or inherent to such a process, method, article, or apparatus.

Referring now to the appended drawings, FIG. 1 illustrates an exemplary network environment and system 100 for generating a parts logbook using blockchain technology, according to the present disclosure. Network environment and system 100 may include a plurality of nodes 110a-110d of a blockchain network, illustrated in the figure. The nodes 110a-110d may be connected to each other through a communications network 105.

Figure 5:
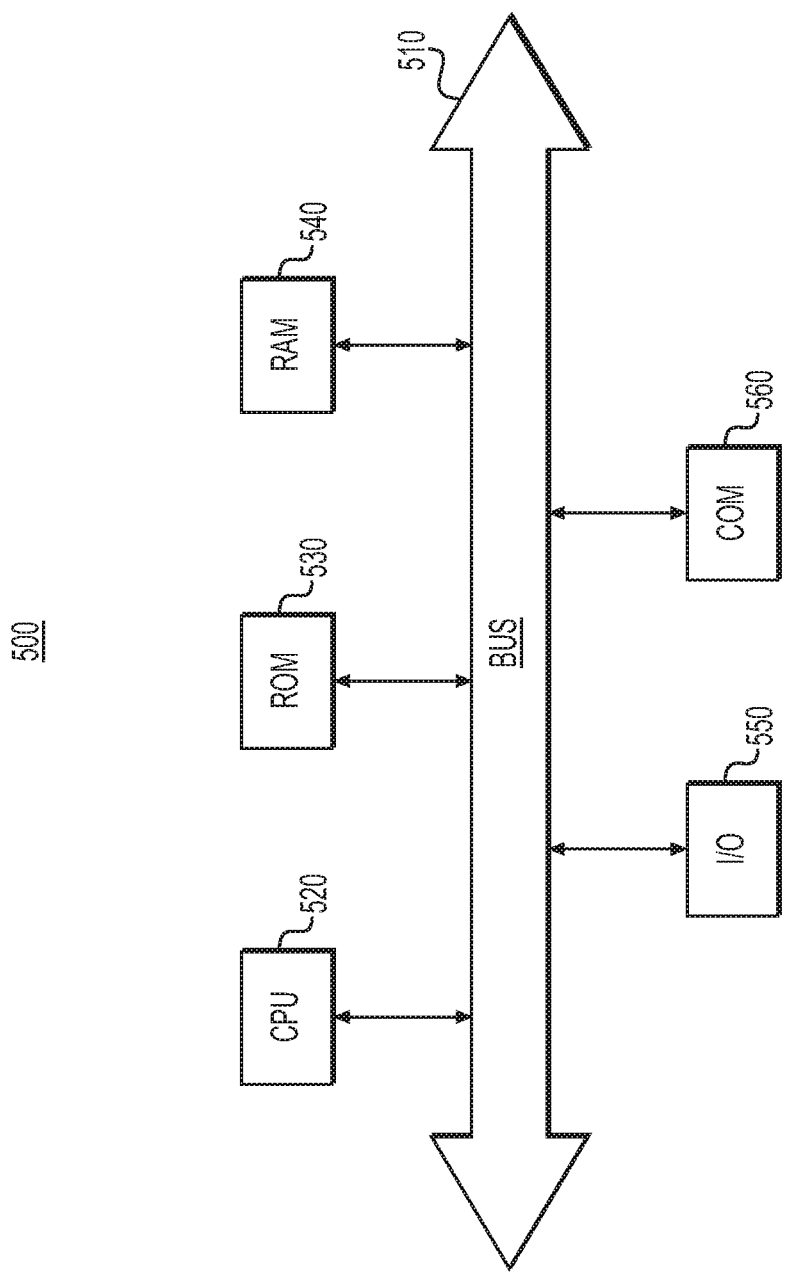
FIG. 5 depicts an example system that may execute techniques presented herein.

In general, any of the nodes 110a-110d may be a computer system, such as the system 500 depicted in FIG. 5. In this disclosure, the term "computer system" generally encompasses any device or combination of devices, each device having at least one processor that executes instructions from a memory. Additionally, a computer system may be part of another computer system.

The total number of nodes is not limited to any specific number. Depending on the implementation, the total number of nodes may, for example, be 2 or more, 5 or more, 10 or more, 100s or more, or thousands or more. The communications network 105 by which the nodes 110a-110d communicate with each other may be a public communications network (such as the Internet), a private communications network, or a communications network comprising a combination of public and private network elements. The communication path between nodes 110a-110d may include any link, such as through satellite communications (e.g., SATCOM), cellular networks, Wi-Fi (e.g., IEEE 802.11 compliant), WiMAX (e.g., AeroMACS), optical fiber, and/or air-to-ground (ATG) network, and/or any other communication links now known or later developed. Each of the nodes 110a-110d may have a hardware communications interface to communicate with other nodes.

Any one or more of the nodes 110a-110d may include a data store, such as data store 120 shown in FIG. 1 (only one data store 120 is shown for clarity). The data store of any of the nodes 110a-110d may, for example, be a database or a file system implemented by a memory of a computer system.

Network environment and system 100 may be a network that manages a database shared among the nodes 110a-110d of the network environment and system 100. In the example shown in FIG. 1, the shared database is exemplified as blockchain 140, which may include a growing list of records, called blocks, which are linked and secured using cryptography techniques. Each block may include a cryptographic hash of the previous block, a timestamp, and data that is recorded by the block, such as data including information pertaining to a parts logbook for a part.

Network environment and system 100 may also be referred to as a blockchain network that comprises nodes 110a-110d. Blockchain 140 may serve as an open, distributed ledger in which any of the nodes 110a-110d in the blockchain network 100 may record information, such as information of a part, in a verifiable and permanent manner. The term "shared database" in this disclosure encompasses the concept of distributed ledgers, which may also be referred to as "shared ledgers." A blockchain is an example of a distributed ledger.

The network environment and system 100 managing the blockchain 140 may be a peer-to-peer network of nodes 110a-110d that collectively adhere to one or more protocols for various operations involving inter-node communication and management of blockchain 140, such as the addition and validation of new blocks. The blockchain may be managed such that the data recorded in any given block cannot be altered retroactively without the alteration of all subsequent blocks, in the absence of collusion of a majority of the member nodes 110a-110d to alter the data. Accordingly, the blockchain 140 may provide data recorded therein with resistance to subsequent modification.

According to some embodiments, blockchain 140 may be a permissioned blockchain, such as a private blockchain or a consortium blockchain. In such embodiments, membership in being a node in the network environment and system 100 may be restricted to pre-approved computer systems and/or computer systems belonging to pre-approved parties. In other implementations, it is also possible for the blockchain 140 to be a public blockchain, such as a blockchain without any access restrictions.

The nodes 110a-110d in the network environment and system 100 may have different functions, permissions, or privileges in performing operations pertaining to usage of the blockchain. Such operations include the submission of a new block to the blockchain network for validation, the validation of a new block, and storage of a copy of the blockchain 140. For example, it is possible for some of the nodes 110a-110d to have only permission to read data from the blockchain 140, while not having permission to submit new blocks for validation or take part in the validation of new blocks. In general, whenever the nodes 110a-110d are collectively described in this disclosure as performing a particular action or process involving the blockchain 140, it is understood that the action or process may be performed by all or only a portion of the nodes 110a-110d.

Copies of the blockchain 140 may be stored in data stores of one or more of the nodes 110a-110d of the blockchain network. While only a single blockchain 140 is depicted in FIG. 1 for simplicity, it is understood that each node 110a-110d may include a respective copy of the blockchain 140 stored in a respective data store 120 of the nodes 110a-110d. A local copy of the blockchain 140 may be a full copy or a partial copy of the blockchain 140. In general, whenever information is described in this disclosure as being added to the blockchain 140, the addition of the information to blockchain 140 may be understood as the addition of the information to the copies of the blockchain 140 stored by all or a sufficient number of the nodes 110a-110d that are relied upon for storage of a copy of the blockchain 140.

While FIG. 1 illustrates nodes that store local copies of the blockchain 140, network environment and system 100 may include nodes that do not store any copies of the blockchain 140, but nonetheless take part in other operations involving the blockchain 140, such as the generation of new blocks for the blockchain 140 and the validation of new blocks generated by other computer systems of the blockchain network. Nodes that do not store local copies of the blockchain 140 may have access to the local copies stored on one or more of the computer systems that do store local copies of the block chain.

The nodes 110a-110d of network environment and system 100 may be operated by various parties. In examples that apply methods and systems of the present disclosure to the aviation industry, parties that may operate nodes 110a-110d include organizations that operate aircraft (such as airlines and freighting or shipment companies), organizations that are involved with the production and/or distribution of aerospace parts (such as producers or suppliers of aircraft parts), and organizations that provide repair and maintenance services for aerospace parts. For example, in FIG. 1, node 110a may be a computer system of a producer of aerospace parts (e.g., organization 108), node 110b may be a computer system of a production manager of the part, node 110c may be a computer system of an owner of the part (e.g., an airline or aerospace company using the part on an aircraft), and node 110d may be a computer system of a maintenance technician that repairs the part.

The computer system 110a of organization 108 may include a memory, one or more processors, communication interfaces, input devices, and output devices. Computer system 110a may include one or more communication interfaces 112. Communication interface 112 may include one or more cellular radios, Bluetooth, WiFi, near-field communication radios, or other appropriate communication devices for transmitting and receiving information. As can be seen in FIG. 1, communication interface 112 facilitates communication between computing system 110a and network 105. Multiple communication interfaces 112 may be included in computing system 110a for providing multiple forms of communication between computer system 110a and nodes 110b-110d via network 105. For example, communication may be achieved with network 105 through wireless communication (e.g., WiFi, radio communication, etc.) and/or a wired data connection (e.g., a universal serial bus, an onboard diagnostic system, etc.) or other communication modes.

Computer system 110a may also include one or more processors and a memory (e.g., data store 120) for storing and executing applications or software modules of network environment and system 100. The one or more processors may be configured to access the memory and execute processor-readable instructions, which when executed by the processor configures the processor to perform a plurality of functions of the network environment and system 100. For example, the one or more processors may include one or more processors 114 for generating a parts logbook using blockchain technology, as detailed further below. The computer system 110a may further include one or more modules which may be software components stored in/by the computer system 110a (e.g., stored on the memory). The modules of computer system 110a may include, for example, a parser, a logbook module 116, a database layer, an authentication module, an application software development kit (SDK) module, and an application programming interface (API) module. Logbook module 116 may be used by processor 114 to generate the parts logbook, stored the parts logbook on the blockchain 140, and send/receive the parts logbook between nodes 110a-110d, as detailed further below.

The data store 120 of computer system 110a may include one or more databases. For example, the data store 120 may include a separate DocStore for storing supporting documents and records of a logbook for a part. The data store 120 (e.g., the DocStore) may include various modules such as a ledger sync module, a document upload module, an optical character recognition (OCR) module, and a store, search, and fetch API module. The data store 120 may access the network 105 to store and retrieve documents and document metadata via a cloud storage service.

Each node 110a-110d may include a client application for accessing and/or modifying the logbook. For example, the client application may be hosted on a mobile device, a maintenance and engineering (M&E) system, a backend computer, or on an Internet of Things (IoT) connected component. The clients (nodes 110a-110d) may be a dedicated terminal providing comprehensive interaction for the logbook. The client application may be a blockchain client. For example, the log-in credentials of user clients may be mapped to one or more corresponding identities of the network environment and system 100.

The client application may include one or more user screens for enabling user interaction with the logbook. The user screens may include, for example, a part fleet dashboard screen, a create logbook and add records screen, a view logbook screen, an ownership transfer screen, and a notifications screen. The part fleet dashboard screen may provide a view of all the parts associated a specific user. The part fleet dashboard may be constructed from aggregating every logbook blockchain channel that is associated with a specific user.

The create logbook and add records screen may enable a user to create and publish data to the logbook. Further, the user may upload supporting documents linked to each record or entry. For example, a dedicated blockchain channel may be generated for each logbook. Data published by the user may be converted into a blockchain transaction and submitted to the blockchain network. Supporting documents may be stored in a database, such as a DocStore, and reference may be stored in the associated blockchain transaction. The processor 114 (e.g., via the DocStore) may perform optical character recognition (OCR) on the supporting document and may store the information to enable searching of the information from the document.

The view logbook screen may provide a transactional view that presents pedigree information of part life cycle events. For example, a legacy view may construct records from digital data and presents the records as an eCopy (e.g., a scanned version) of an existing paper logbook. The client may sync with the blockchain ledger to present live logbook data. For example, the DocStore may construct records from the blockchain 140 in a format as requested by the user. The view logbook screen may also include a search bar to access desired data quickly.

The ownership transfer screen may enable the part owner to transfer the logbook (e.g., either permanently or temporarily) to another member of the network environment and system 100, as detailed below. For example, processor 114 may convert the user request into a corresponding blockchain transaction. The notifications screen may display notifications and/or alerts that are generated automatically or issued by other members in the logbook. Alerts may be triggered by smart contracts or notifications pushed by a logbook member to one or more other members in the logbook system (e.g., in the network environment and system 100).

Figure 2:
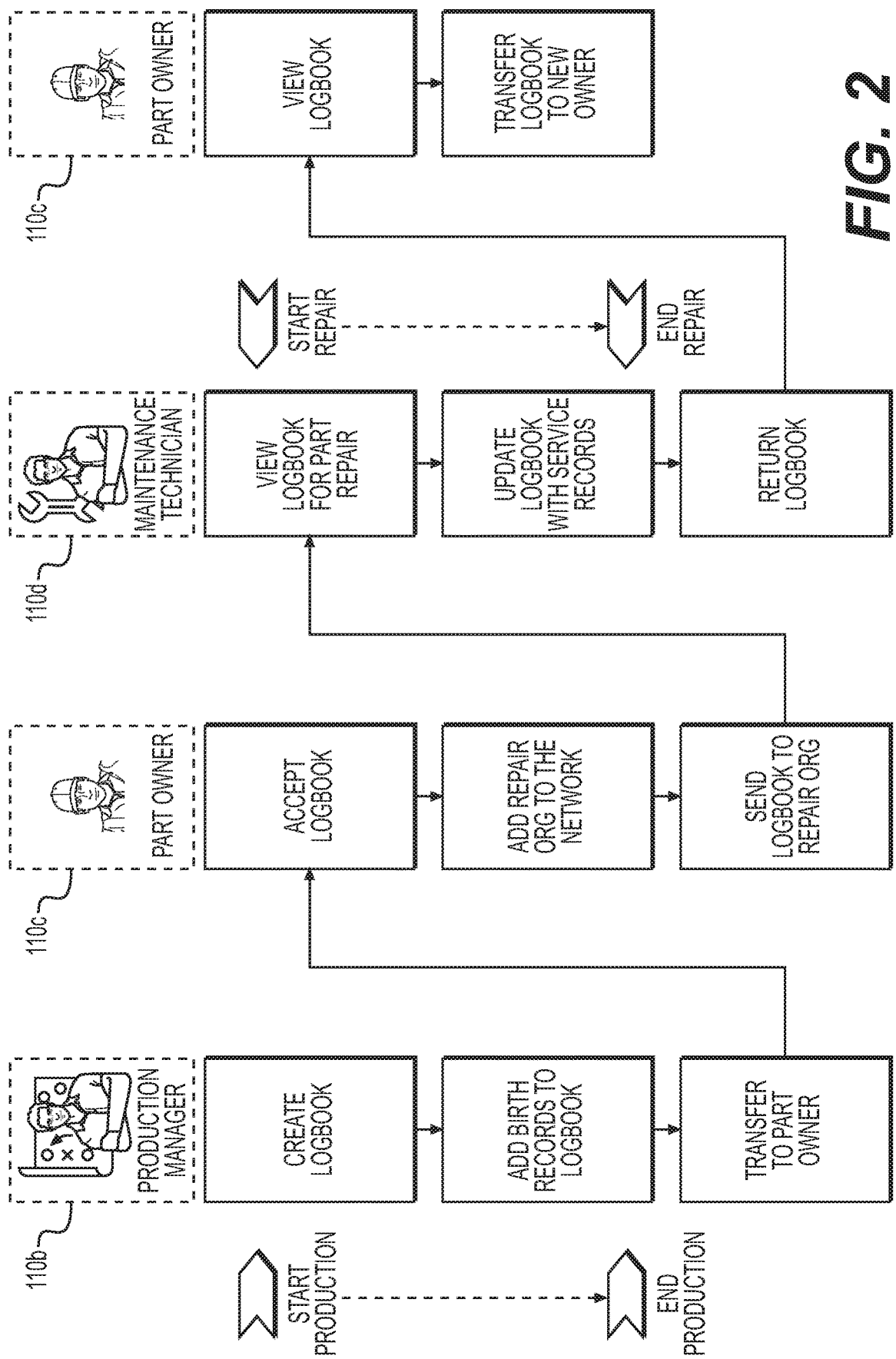
FIG. 2 depicts an exemplary process of generating a parts logbook using the network environment and system of FIG. 1.

FIG. 2 is a block diagram of a process of generating a parts logbook using the network environment and system 100. As shown in FIG. 2, the nodes 110b-110d may communicate with each other (e.g., via network 105) in order to create, transfer, and update the parts logbook for a part. For example, when a part is being produced at organization 108, the production manager may create a parts logbook for the part (e.g., via production manager device 110b). When the part is produced and manufacturing is complete, the production manager may add birth records of the part to the logbook via the device 110b. The birth records may include, for example, a configuration report document, a service report document, airworthiness directives document, life limited parts document, and/or accessories document. Birth record information of the part may include, for example, model number, part number, serial number, manufacture date, manufacture location, and/or description of the part.

After the logbook is created and the birth records are added, the production manager may transfer the logbook to the part owner (e.g., from production manager device 110b to part owner device 110c via network 105). For example, the production manager, or another user, may input an organization name, organization e-mail address, and/or a membership service provider (MSP) configuration associated with the part owner. The MSP configuration may enable the production manager, or other user associated with the host organization 108, to define the members of a trust domain. In other words, the MSP configuration enables the production manager or other user associated with the host organization 108 to invite and/or add members/participants to the blockchain network such that the invited and/or added members/participants may view/write to the blockchain 140. In some instances, the MSP configuration may define specific roles (e.g., auditor, MRO, operator, etc.) of the invited and/or added members and may set the basis for defining access privileges for each added member (e.g., channel administrators, readers, and/or writers). The part owner may accept the logbook and, thus may be added to the blockchain network. Information of the transfer from the host organization/production manager to the part owner may be recorded in the logbook via blockchain 140. For example, a smart contract may validate the ownership rules to commit the transfer transaction. Additionally, administrative privileges of the current owner may be transferred to the new owner by processor 114. The information of the transfer may include, for example, a date, condition of the part, an event type, an event description, origin location, and destination location.

In some instances, the part associated with the logbook may need to undergo maintenance, repair, other services, etc. In these instances, the part owner may send the part to a maintenance and repair organization (MRO), for example, to repair or service the part. Accordingly, the part owner may add the MRO to the blockchain network. For example, the part owner may input an organization name, organization e-mail address, and/or a MSP configuration associated with the MRO. As such, the MRO may be added to the blockchain network and the part owner may send the logbook for the part to the MRO (e.g., from part owner device 110c to maintenance technician device 110d).

The maintenance technician may view the logbook, repair or service the part, and update the logbook with service records for the part. For example, the maintenance technician may upload/add service record documents containing information about the service provided for the part via maintenance technician device 110d. The service record documents may include, for example, an authorized release certificate document uploaded/sent to the blockchain. The authorized release certificate document may be a form provided by a governmental agency, such as the Federal Aviation Administration (FAA), to approve or certify a part for return to service after maintenance has been performed on the part. The service record documents may also include records of the service performed for the part uploaded/added to the logbook. The service record documents may include documents in any file format, such as, for example, .doc, .xls, .pdf, or the like.

When service and/or maintenance of the part is complete, the maintenance technician may return the part to the part owner. Accordingly, the maintenance technician may return the logbook for the part to the part owner (e.g., from the maintenance technician device 110*d* to the part owner device 110*c*). The part owner may view the logbook for the part including the service records, and the location history of the part (e.g., shipping locations). Thus, the logbook for the part may be generated, viewed, and updated by various users of the blockchain network.

The generated logbook for the part may include a replica of a paper logbook for the part. For example, the replica of the paper logbook for the part may include information and documents associated with a paper logbook for the part. The information and documents may include, for example, part data, inspection data, inspection status, serialized components, service records, service bulletin records, airworthiness directives, part location information, life limited parts information, accessories information, serviceability records information, ownership transfer information, lease transfer information, flight hours/cycles information, or any other information/documents related to the part. The replica of the paper logbook for the part may include images of digital copies/scans of the physical documents associated with the paper logbook for the part. Accordingly, a digital logbook for the part may be generated, as detailed further below. Further, the generated logbook for the part may be transferred to a new owner when the part, or an assembly including the part, is sold. The part owner may transfer the logbook for the part to a new part owner (e.g., from the part owner device 110*c* to a new part owner device 110*c*). The transfer information, as well as the new part owner information, may be recorded in the logbook for the part.

Each of the nodes 110*a*-110*d* may also establish identities of individual users within the organization and may associate roles with each individual user. For example, organizations associated with the nodes 110*a*-110*d* may assign roles to employees. When an individual employee performs a transaction, all members of the network environment and system 100 for the logbook may be able to identify the employee and the role associated with the employee. Each user may have credentials such as a FAA certificate or organization-specific certificate. User credentials may be mapped to a user's blockchain identity. When a user posts a transaction, the user credentials required for that specific transaction may be recorded in the blockchain 140 as a digital stamp. Roles and credentials associated with the blockchain identity may be managed in a secure wallet (e.g., stored on data store 120). The membership service provider (MSP) may validate user identity.

Some roles (e.g., owner and/or MRO technician) may also transfer rotatable parts, such as life limited parts and CMMC. For example, the owner may transfer a component in the current aircraft from its logbook to another logbook or to an open pool (e.g., inventory). The logbook may include a logbook for an aircraft including entries for parts associated with the aircraft. When a part is installed on the aircraft, the entry of the part may be added to the logbook. Likewise, when a part is removed from the aircraft, the entry for the part may be removed from the logbook. An entry for a part in the logbook may include the information and documents associated with a paper logbook for the part, as detailed above. Such transfers of rotatable parts may by cross channel or cross network transactions executed through an interoperable smart contract deployed across the channel or network that is participating in the transaction. For example, the entire history of the rotatable part may be transferred to the receiving channel.

An owner may also transfer custody, for example, when the owner rents or leases the component with the part. A smart contract may be executed that grants partial control of the logbook channel to the renter or lessee. For example, the renter or lessee may add members to the logbook to help maintain the logbook. However, the renter or lessee may not be able to transfer ownership of the logbook.

Figure 3:
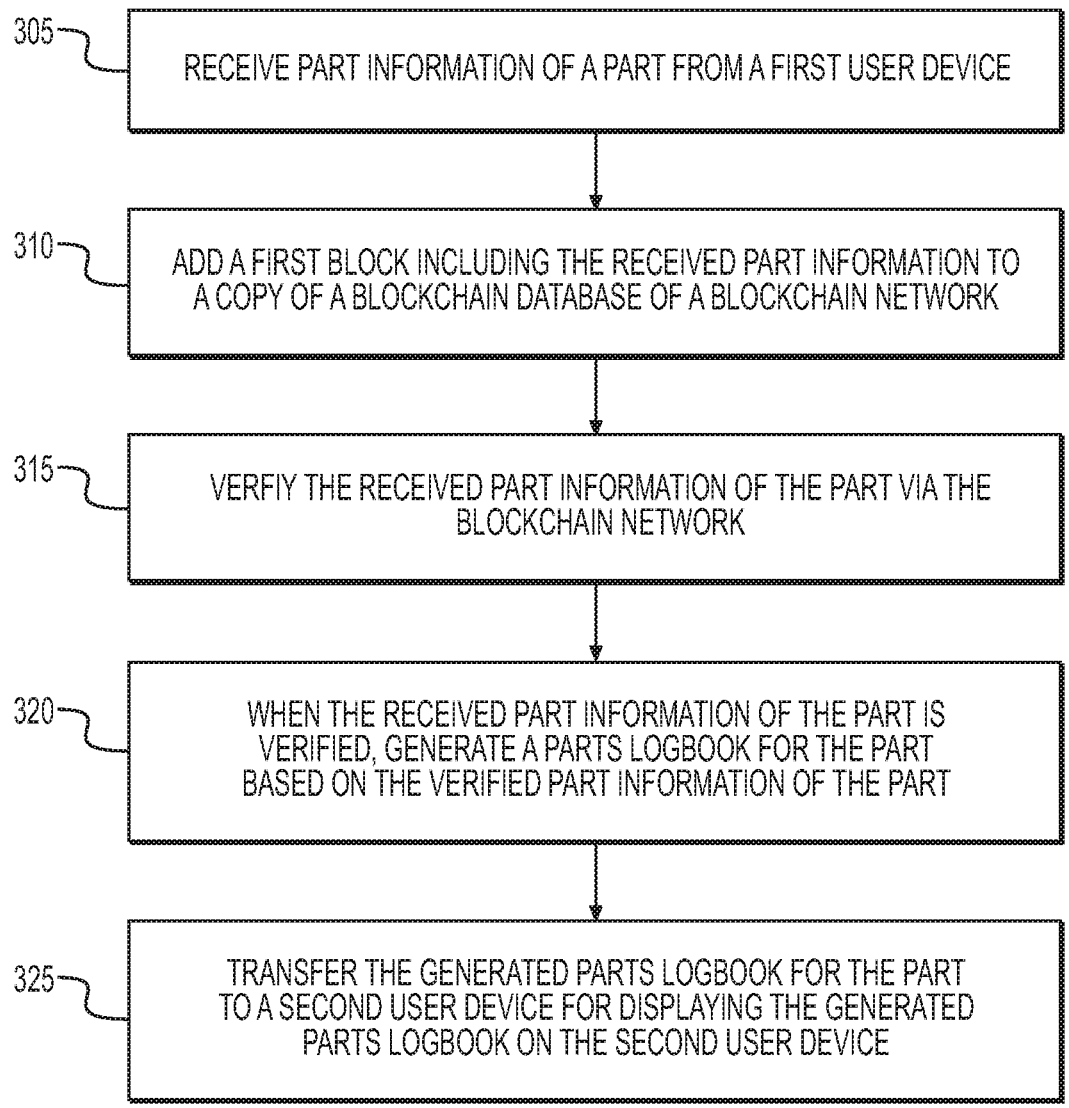
FIG. 3 depicts a flowchart of an exemplary method for generating a parts logbook using blockchain technology, according to one or more embodiments

FIG. 3 is a flowchart of a method 300 for generating a parts logbook using blockchain technology, according to one or more embodiments. In an initial step 305, processor 114 may receive part information of a part from a first user device 110*b*. For example, the production manager may create the logbook for the part and add information of the part to the created logbook. The part information may include, for example, model number, part number, serial number, manufacture date, manufacture location, or description of the part.

In step 310, the processor 114 may add a first block including the received part information to a copy of a blockchain database 140 of a blockchain network. In step 315, the processor 114 may verify the received part information of the part via the blockchain network. For example, the processor 114 may receive a documents including the part information to verify the part information. In some embodiments, processor 114 may receive a MSP configuration record associated with the host organization and/or associated with the production manager, to verify the received part information. In some embodiments, the processor 114 may receive consensus of the part information from the blockchain network to verify the part information.

In step 320, when the processor 114 has verified the received part information of the part, the processor 114 may generate a parts logbook for the part based on the verified part information of the part. In some embodiments, the part information may further include birth record information of the part. The processor 114 may receive one or more images or documents of the birth record of the part from the first user device 110*b*. The processor 114 may extract from the received images or documents birth record information of the part. The processor 114 may add a second block including the birth record information of the part to the copy of the blockchain database 140 of the blockchain network. The processor 114 may verify the birth record information of the part via the blockchain network. For example, the processor 114 may receive documents including the birth record to verify the part information. In some embodiments, processor 114 may receive a MSP configuration record associated with the host organization and/or associated with the production manager, to verify the received birth record information. In some embodiments, the processor 114 may receive consensus of the birth record information from the blockchain network to verify the birth record information. When the birth record information of the part is verified, the processor 114 may update the parts logbook for the part based on the verified birth record information. Accordingly, the parts logbook for the part may include the birth record information and the one or more images or documents of the birth record of the part.

In step 325, the processor 114 may transfer the generated parts logbook for the part to a second user device 110*c* for displaying the generated parts logbook on the second user device 110*c*. For example, the production manager, or other user of the host organization 108 may transfer the parts logbook for the part to the part owner when the part is sold.

During the life cycle of the part, the part may undergo location changes, may require maintenance, or other service. Accordingly, the parts logbook for the part may be updated to include life cycle information. In these instances, the processor 114 may receive life cycle information of the part from a third user device 110d. For example, the part owner may transfer the parts logbook for the part to a third user, such as a maintenance technician when the part requires maintenance or other service. The maintenance technician may upload life cycle information, such as service records, for the part to the parts logbook for the part. The processor 114 may add a second block including the received life cycle information of the part to the copy of the blockchain database 140 of the blockchain network. The life cycle information may include at least one of current ownership information, ownership date, current part location, and/or part relocation date. The life cycle information of the part may also include a service record for the part.

The processor 114 may verify the received life cycle information of the part via the blockchain network. For example, the processor 114 may receive documents including the service records or life cycle records to verify the life cycle information. In some embodiments, processor 114 may receive a MSP configuration record associated with the maintenance technician to verify the received life cycle information. In some embodiments, the processor 114 may receive consensus of the life cycle information from the blockchain network to verify the life cycle information. When the life cycle information of the part is verified, the processor 114 may update the parts logbook for the part based on the verified life cycle information. Accordingly, the parts logbook for the part may include the life cycle information and the one or more images or documents of the life cycle information of the part. When the received life cycle information of the part is verified, the processor 114 may update the parts logbook for the part based on the verified life cycle information of the part. In one embodiment, a logbook for a part may include, for example, birth record, service bulletin status, service records, inspection status, published airworthiness status, life-limited parts record, ownership transfer information, lease transfer information, part cycles, and/or part trace. The part trace may include a history of the part from the logbook, as detailed below.

Processor 114 may also perform analytics on the generated logbook. For example, processor 114 may perform analytics to generate valuable reports such as compliance reports, current configuration, LLP trace, automated data package for audits. The organization 108 may also issue periodical service bulletins through the logbook. For example, processor 114 may automatically verify compliance against issued service bulletins and alerts the user for each logbook. Processor 114 may generate and publish smart contracts with reference data for various services, such as, for example, part (e.g., engine) configurations, recommended airworthiness directives, service bulletins, or the like. If the logbook user is subscribed to these services, blockchain 140 may validate logbook content with the reference data to generate value added reports.

FIG. 4 depicts an exemplary view of a digital parts logbook 400 generated using the network environment and system 100. As shown in FIG. 4, the parts logbook 400 may include a "Part Trace" for the part. The "Part Trace" may include record of a history for the part. For example, the parts logbook 400 may include a date, a condition, event type, event, origin, and destination for each event associated with the part and recorded to the logbook 400. In the exemplary parts logbook 400, the part was returned to the host organization 108 from organization X. For example, a first airline may have returned the part to the host organization 108. The host organization 108 sold the part to organization Y (e.g., a second airline). Organization Y then sent the part to the host organization 108 for maintenance and/or service. The host organization 108 sent the part to a service center. In this example, the service center is associated with the host organization 108. The service center serviced and/or repaired the part and sent the part back to the host organization 108. Thus, the logbook 400 was generated and updated with part information, life cycle information, and service records for the part, by the method 300, detailed above.

FIG. 5 depicts an example system that may execute techniques presented herein. FIG. 5 is a simplified functional block diagram of a computer that may be configured to execute techniques described herein, according to exemplary embodiments of the present disclosure. Specifically, the computer (or "platform" as it may not be a single physical computer infrastructure) may include a data communication interface 560 for packet data communication. The platform may also include a central processing unit ("CPU") 520, in the form of one or more processors, for executing program instructions. The platform may include an internal communication bus 510, and the platform may also include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for generating a parts logbook using blockchain technology, the method comprising:
   receiving, by a processor, part information of a part of a vehicle or equipment from a first user device, the part information comprising a birth record including one or more of: a configuration report, a service report, airworthiness directives data, life limited parts data, and accessories data;
   adding, by the processor, a first block including the received part information to a copy of a blockchain database of a blockchain network;
   verifying, by the processor, the received part information of the part via the blockchain network;
   when the received part information of the part is verified, generating, by the processor, a parts logbook for the part based on the verified part information of the part, the generated parts logbook comprising a data record of the part and/or parts of the vehicle or equipment; and
   transferring, by the processor, the generated parts logbook for the part to a second user device for displaying the generated parts logbook on the second user device, the generated parts logbook transferred to the second user device comprising the data record of the part and/or parts of the vehicle or equipment.

2. The computer-implemented method of claim 1, wherein the part information of the part includes at least one of: model number, part number, serial number, manufacture date, manufacture location, or description of the part.

3. The computer-implemented method of claim 1, further comprising:
   receiving, by the processor, one or more images or documents of the birth record of the part from the first user device;
   extracting, by the processor, from the received images or documents birth record information of the part;
   adding, by the processor, a second block including the birth record information of the part to the copy of the blockchain database of the blockchain network;
   verifying, by the processor, the birth record information of the part via the blockchain network; and
   when the birth record information of the part is verified, updating, by the processor, the parts logbook for the part based on the verified birth record information.

4. The computer-implemented method of claim 1, further comprising:
   receiving, by the processor, life cycle information of the part from a third user device;
   adding, by the processor, a second block including the received life cycle information of the part to the copy of the blockchain database of the blockchain network;
   verifying, by the processor, the received life cycle information of the part via the blockchain network; and
   when the received life cycle information of the part is verified, updating, by the processor, the parts logbook for the part based on the verified life cycle information of the part.

5. The computer-implemented method of claim 4, wherein the life cycle information of the part includes at least one of current ownership information, ownership date, current part location, or part relocation date.

6. The computer-implemented method of claim 4, wherein the life cycle information of the part includes a service record for the part.

7. The computer-implemented method of claim 6, further comprising:
   receiving, by the processor, one or more images or documents of the service record of the part;
   extracting, by the processor, from the received images or documents service record information of the part;

adding, by the processor, a third block including the service record information of the part to the copy of the blockchain database of the blockchain network;

verifying, by the processor, the service record information of the part via the blockchain network; and when the service record information of the part is verified, updating the parts logbook for the part based on the verified service record information.

8. A system for generating a parts logbook using blockchain technology, the system comprising:

a memory having processor-readable instructions therein; and at least one processor configured to access the memory and execute the processor-readable instructions, which when executed by the processor configures the processor to perform a plurality of functions, including functions for:

receiving part information of a part from a first user device of a vehicle or equipment, the part information comprising a birth record of the part;

adding a first block including the received part information to a copy of a blockchain database of a blockchain network;

verifying the received part information of the part via the blockchain network;

when the received part information of the part is verified, generating the parts logbook for the part based on the verified part information of the part, the generated parts logbook comprising a data record comprising of the part on the vehicle or equipment; and transferring the generated parts logbook for the part to a second user device for displaying the generated parts logbook on the second user device;

receiving life cycle information of the part from a third user device, the life cycle information comprising a service record for the part;

adding a second block including the received life cycle information to the copy of the blockchain database;

upon verifying the received life cycle information via the blockchain network, updating the parts logbook based on the verified life cycle information;

adding a third block comprising the service record to the copy of the blockchain database;

upon verifying the service record information of the part via the blockchain network, updating the parts logbook for the part based on the verified service record information.

9. The system of claim 8, wherein the part information of the part includes at least one of: model number, part number, serial number, manufacture date, manufacture location, or description of the part.

10. The system of claim 8, wherein the life cycle information of the part includes at least one of current ownership information, ownership date, current part location, or part relocation date.

11. The system of claim 8, wherein the functions further include functions for:

receiving one or more images or documents of the service record of the part; and extracting from the received images or documents service record information of the part.

12. A non-transitory computer-readable medium containing instructions for generating a parts logbook using blockchain technology, comprising:

receiving, by a processor, part information of a part of a vehicle or equipment from a first user device;

adding, by the processor, a first block including the received part information to a copy of a blockchain database of a blockchain network;

verifying, by the processor, the received part information of the part via the blockchain network;

when the received part information of the part is verified, generating, by the processor, the parts logbook for the part based on the verified part information of the part;

transferring, by the processor, the generated parts logbook for the part to a second user device for displaying the generated parts logbook on the second user device, the generated parts logbook transferred to the second user device comprising a record comprising a data record of the part and/or parts of the vehicle or equipment;

adding a second block comprising life cycle information of the part to the copy of the blockchain database; and upon verifying the received life cycle information via the blockchain network, updating the parts logbook based on the verified life cycle information.

13. The non-transitory computer readable medium of claim 12, further comprising:

receiving, by the processor, one or more images or documents of a birth record of the part from the first user device;

extracting, by the processor, from the received images or documents birth record information of the part.

14. The non-transitory computer readable medium of claim 12, further comprising:

receiving, by the processor, one or more images or documents of a service record of the part from a third user device;

extracting, by the processor, from the received images or documents service record information of the part;

adding, by the processor, a second block including the service record information of the part to the copy of the blockchain database of the blockchain network;

verifying, by the processor, the service record information of the part via the blockchain network; and when the service record information of the part is verified, updating the parts logbook for the part based on the verified service record information.

15. The non-transitory computer readable medium of claim 14, further comprising:

adding a third block comprising the service record to the copy of the blockchain database;

upon verifying the service record information of the part via the blockchain network, updating the parts logbook for the part based on the verified service record information.

16. The non-transitory computer readable medium of claim 12, wherein the part information comprises a birth record, the birth record comprising a configuration report document, a service report document, an airworthiness directives document, a life limited parts document, and/or an accessories document.

17. The non-transitory computer readable medium of claim 12, wherein the generated parts logbook comprising a record comprising all data concerning the part and/or parts on a vehicle or an equipment.

* * * * *